Figure 5:
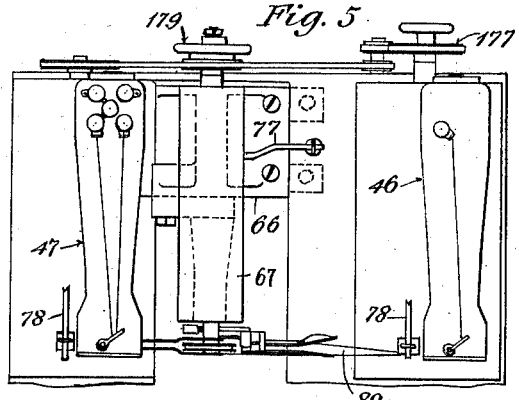

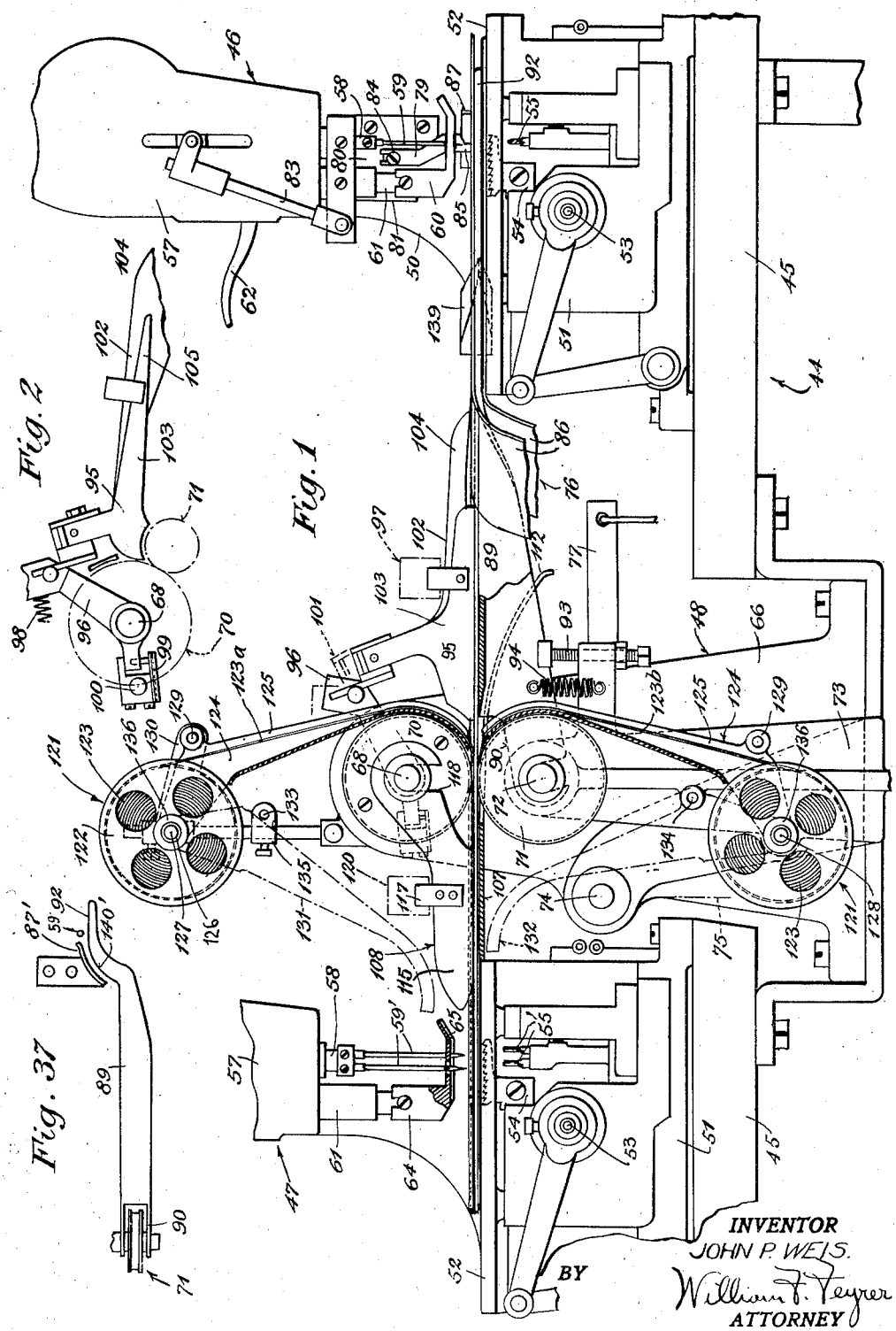

May 9, 1939. J. P. WEIS 2,157,368
MACHINE FOR FORMING SEAMS
Filed Nov. 10, 1934 6 Sheets-Sheet 2

INVENTOR
JOHN P. WEIS.
William T. Feyrer
ATTORNEY

May 9, 1939.  J. P. WEIS  2,157,368
MACHINE FOR FORMING SEAMS
Filed Nov. 10, 1934  6 Sheets-Sheet 3

INVENTOR
JOHN P. WEIS.
BY William F. Feyrer
ATTORNEY

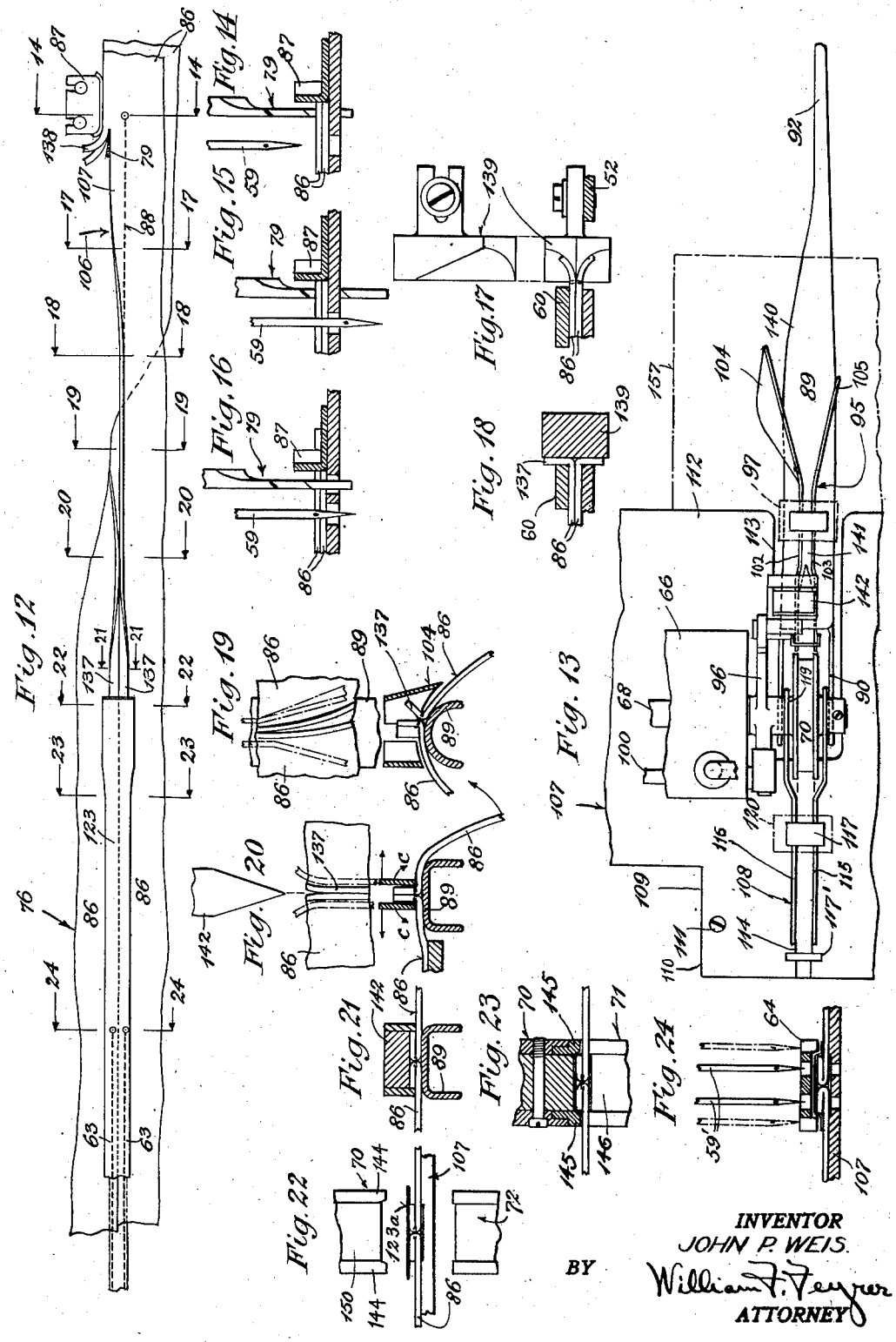

May 9, 1939.   J. P. WEIS   2,157,368
MACHINE FOR FORMING SEAMS
Filed Nov. 10, 1934   6 Sheets-Sheet 5
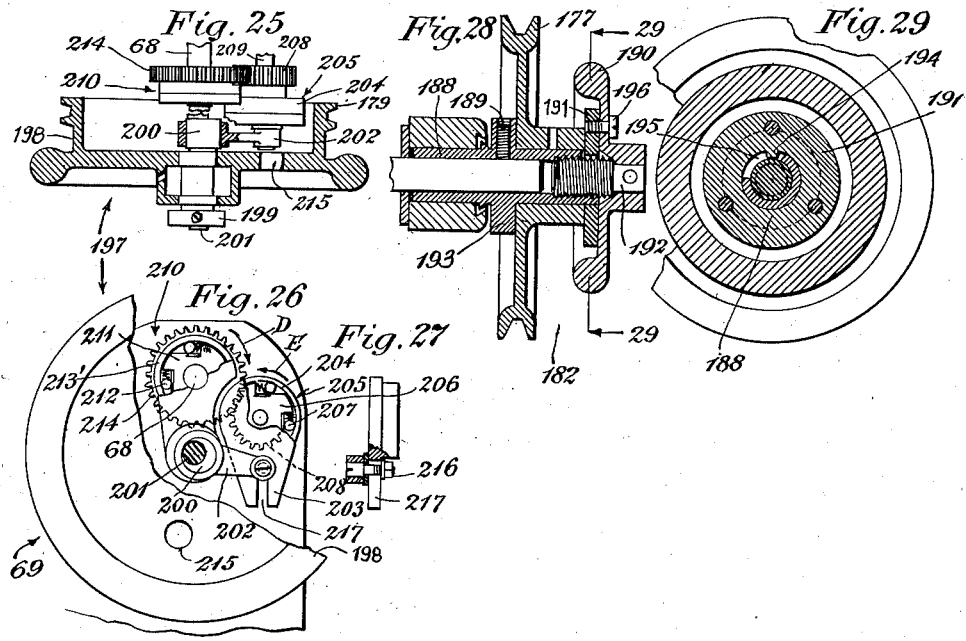
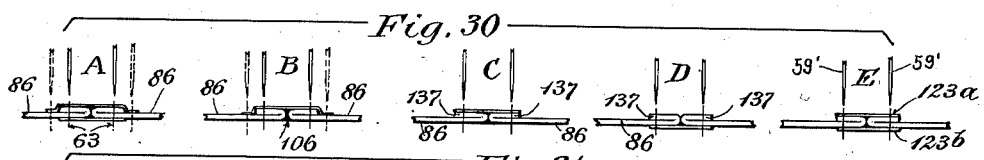
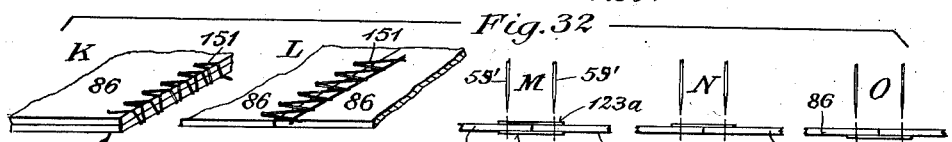
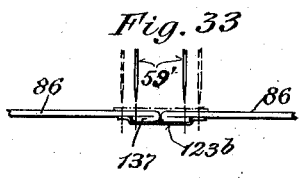
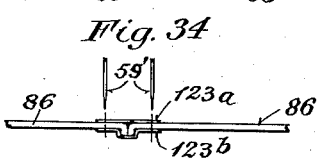
INVENTOR
JOHN P. WEIS
BY
ATTORNEY May 9, 1939.  J. P. WEIS  2,157,368
MACHINE FOR FORMING SEAMS
Filed Nov. 10, 1934   6 Sheets—Sheet 6

INVENTOR
JOHN P. WEIS.
BY William F. Feyrer
ATTORNEY

Patented May 9, 1939

2,157,368

UNITED STATES PATENT OFFICE 2,157,368

MACHINE FOR FORMING SEAMS

John P. Weis, Nyack, N. Y., assignor to Willcox & Gibbs Sewing Machine Company, New York, N. Y., a corporation of New York Application November 10, 1934, Serial No. 752,457
In Canada September 28, 1934

6 Claims. (Cl. 112—2)

This invention relates to improved methods and apparatus to form seams, for various articles of manufacture such as shoes, sporting goods, articles made from leather, canvas, and other materials, and also wearing apparel requiring strong, flat, seams, and especially for the taped seams of shoe uppers or quarters.

It is an object of the present invention to provide a seam forming machine adapted to form a wide variety of novel, strong, useful, and ornamental seams; and particularly to form a seam with tapes sewed to both sides of the seam, viz. to both the inside and outside of the seam.

A further object of the present invention is to provide improved methods of forming seams.

My United States Patents Nos. 1,809,460; 1,809,461; 1,809,462; 1,975,813 and other patents or applications disclose a novel method and several forms of apparatus for joining superposed plies with a seam and in the same machine applying and stitching a plain tape to only one side of the seam. In my U. S. application Serial No. 734,084 filed July 7, 1934, there is disclosed a novel method and apparatus for opening the plies and applying an adhesive tape to either one or to both sides of the seam.

It is an object of the present invention to provide an improved mechanism for applying either plain or adhesive tape or both plain and adhesive tape to one or to both sides of a seam.

Features resulting from the attainment of this object include a novel tape supply and guide capable of being located in predetermined positions longitudinally relative to the work and apparatus, and both above and below the work. This feature is further enhanced by providing a guide which is in the form of a single channel from a remote tape supply to a place close to the point of applying the tape, entirely open on one or two sides in order to facilitate directing, starting, and loading the tape, yet having the characteristic of positively controlling the placement of the tape relative to the seam or the like.

It is a further and particular object of the present invention to provide an apparatus capable of joining superposed plies with a seam, applying either one or two plain or adhesive tapes to the seam, and in the same general machine stitching the tape or tapes to the main ply for added strength, or for ornamental effects as by the use of colored threads, or for both strengthening and ornamental effects.

Features in connection with this object include the provision of a highly efficient tandem arrangement of a sewing mechanism for forming a main seam, a taping mechanism and a second sewing mechanism for subsequently stitching the tape or tapes all driven coordinately, and with novel work guides and controls between the various mechanisms.

Another object of the present invention is to provide improved apparatus to join plies with a curved seam and to apply tapes to the curved seam.

A feature in connection with this object includes the provision of a curved section of predetermined form directly on a work support adjacent the original seam forming stitching instrumentalities together with a cooperating plate adapted to force the stitched work into engagement with the curve section and thereby consistently controlling the shape of the work.

Another very important object of the present invention is to provide a unitary apparatus capable of joining plies with a seam wherein the machine may be quickly conditioned for the formation of various types and sizes of seams and wherein the apparatus may be used either to apply a tape adhesively or by stitching or both adhesively and by stitching, thereby effecting a considerable economy in the original investment for equipment and saving in the amount of floor space required for machinery.

One of the features in connection with this last named object includes interchangeable guides which may be simply hooked into place and which are always sure to be centralized since the side walls thereof are located by the side walls of the central pressing roller or pressing member. Other features include the provision of novel guides and work supports which may be used substantially without change for applying an adhesive tape to one or to both sides of the work either adhesively, by stitching, or both adhesively and by stitching.

A further object is to provide improved controls for variously interrupting and controlling the various elements of the machine and thereby insuring a more satisfactory final product.

Features in connection with this object include the provision of a novel foot control and a novel hand control, either or both of which may be used advantageously to briefly interrupt the operation of certain elements in the machine.

Other objects, features, and advantages will be apparent or will appear hereinafter.

Figure 6:
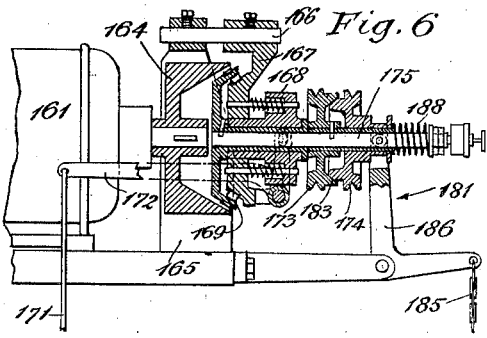
Figure 7:
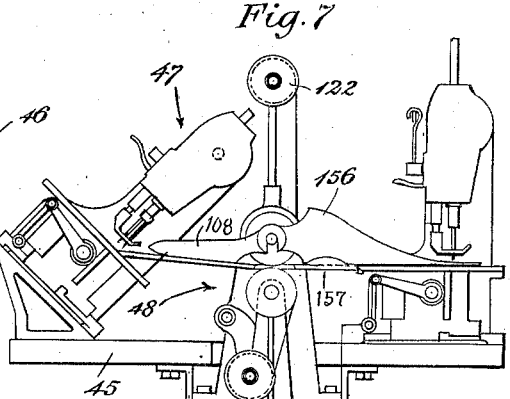
Figure 3:
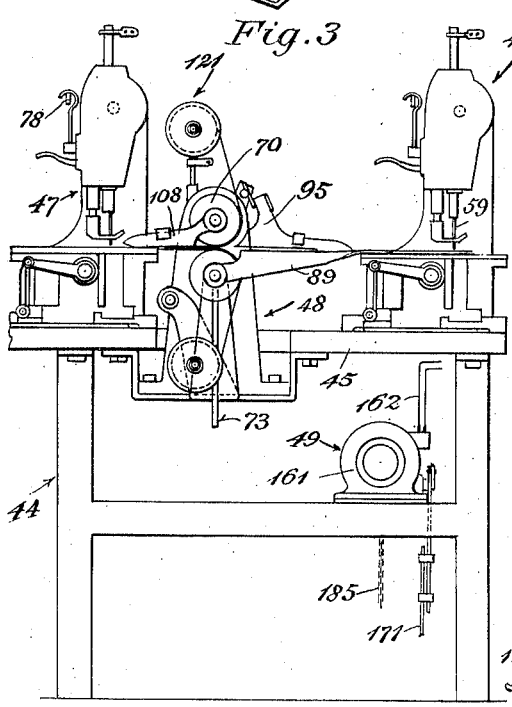
Figure 4:
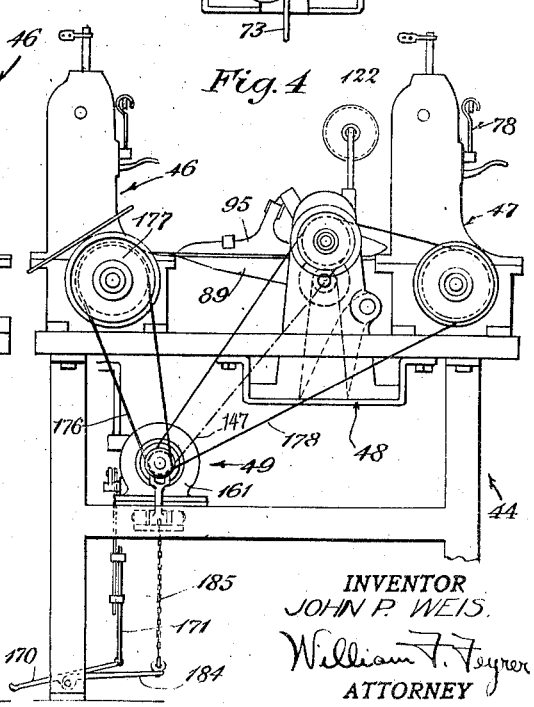

In the drawings:

Figure 1 is a side view of the main operating parts of the present invention. Fig. 2 is a detail of a modified upper guide and of the guide pressing and lifting mechanism. Fig. 3 is a side view similar to Fig. 1, on a smaller scale, but also shows the main driving mechanism. Fig. 4 is a view similar to Fig. 3 but of the opposite side of the machine. Fig. 5 is a top view of the machine shown in Figs. 3 and 4. Fig. 6 is a sectional view of the main driving mechanism controls. Fig. 7 is a view similar to Figs. 1 and 3 but shows the second sewing machine at an angle.

Figure 8:
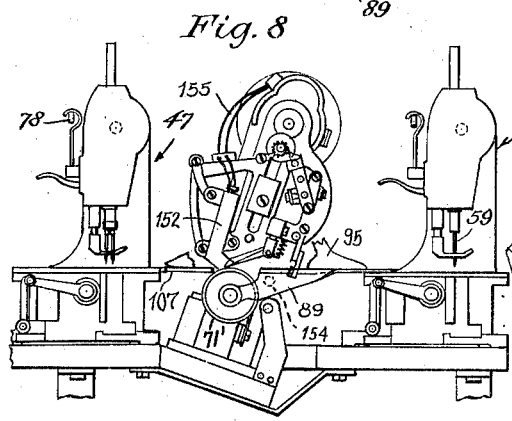
Figure 11:
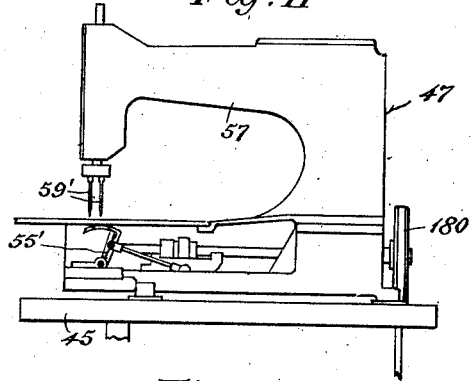
Figure 10:
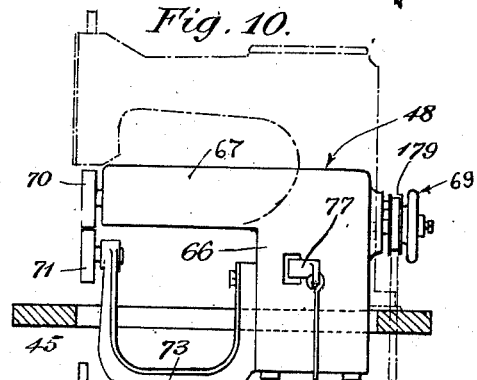
Figure 9:
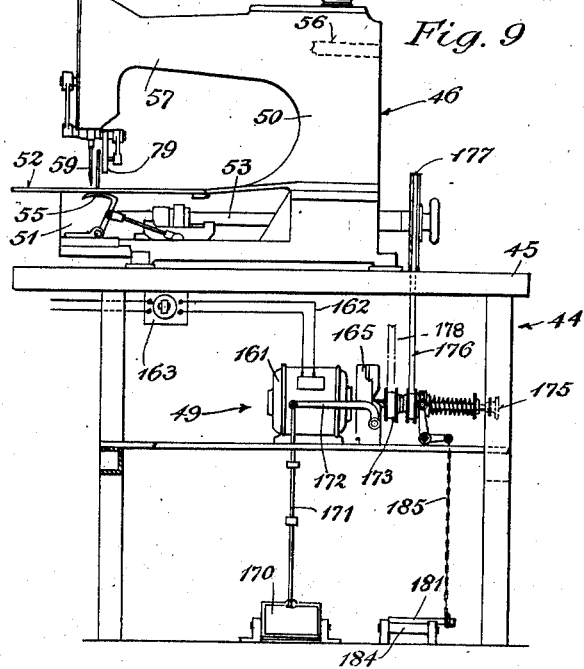

Fig. 8 is a view similar to Fig. 3 but shows another form of standard taping mechanism. Fig. 9 is a front view of the first sewing mechnism. Fig. 10 is a front view of the taping mechanism. Fig. 11 is a front view of the second sewing machine. Fig. 12 is a top plan view showing the various steps to which the present invention subjects the work. Fig. 13 is a top plan view of the main guides and work manipulating mechanism. Figs. 14, 15, and 16 are fragmentary details showing the method of guiding, stitching, and trimming two plies of material taken on line 14—14 in Fig. 12.

Fig. 17 is a detail of the plow for separating and spreading the seam margins, taken on line 17—17 in Fig. 12. Fig. 18 is a fragmentary detail similar to Fig. 17 but shows the plow pressing the seam margins in spread condition, on line 18—18 in Fig. 12. Fig. 19 discloses fragmentary details for initially underturning one ply and guiding the seam margins, taken on line 19—19 in Fig. 12. Fig. 20 discloses fragmentary details of the work deep in the upper guide and with the lower ply nearly fully underturned, taken on line 20—20 in Fig. 12. Fig. 21 shows the plow pressing the seam margins onto the main plies and shows the upper guide directing the work by the seam margins.

Fig. 22 is a fragmentary partially exploded view showing the tapes loosely applied to both sides of the seam and showing the rollers in spread relation thereto. Fig. 23 is a fragmentary and sectional view of the two rollers pressing the tapes onto both sides of the seam. Fig. 24 is a fragmentary sectional view of the stitching mechanism of the second sewing machine, taken on line 24—24. Fig. 25 is a sectional view of the step-by-step driving mechanism for the taping machine. Fig. 26 is a fragmentary end view of the driving mechanism shown in Fig. 25. Fig. 27 is a fragmentary detail of the adjustment for the taping machine driving mechanism.

Fig. 28 is a longitudinal sectional view of the secondary main drive control. Fig. 29 is a transverse sectional view of the device shown in Fig. 28, taken on line 29—29 thereof.

Figs. 30A–E illustrate various seams with folded seam margins made in accordance with this invention. Figs. 31F–J are similar to Figs. 30A–E but illustrates other seams with unfolded seam margins. Figs. 32K–O illustrate seams made with overedge stitching and with abutting seam margins. Figs. 33 and 34 illustrate respectively a seam with folded seam margins and with unfolded seam margins, representative of over turned main plies and hidden seam margins.

Figure 38:
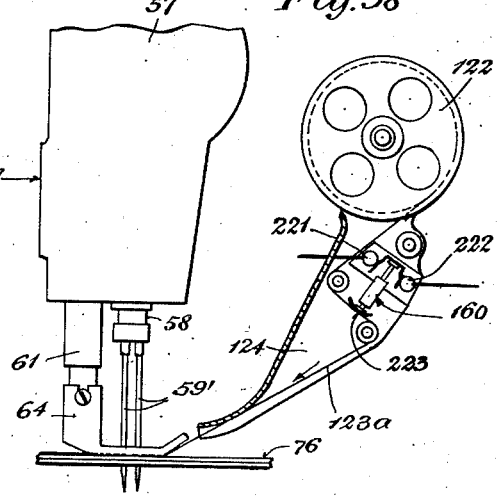
Figure 39:
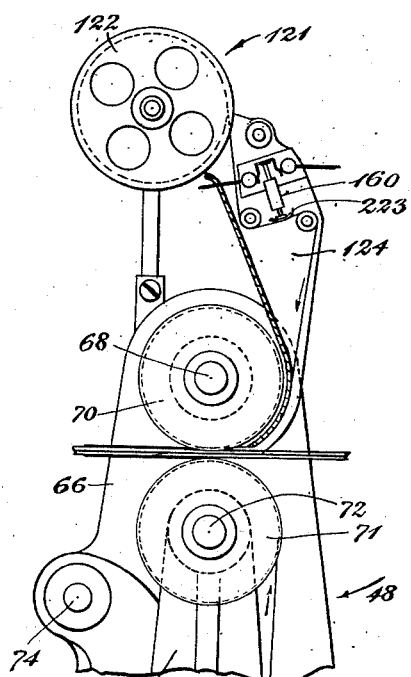
Figure 35:
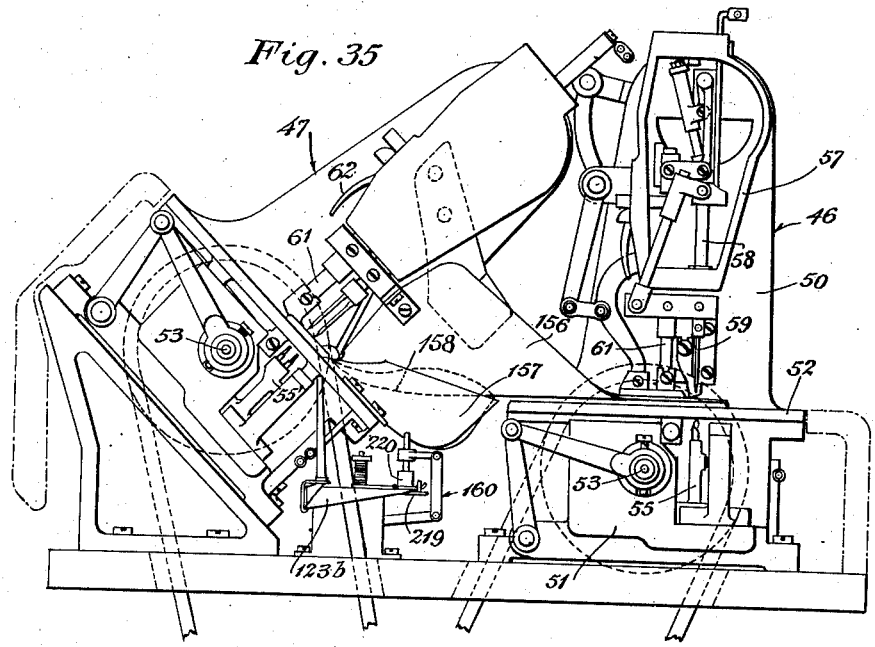
Figure 36:
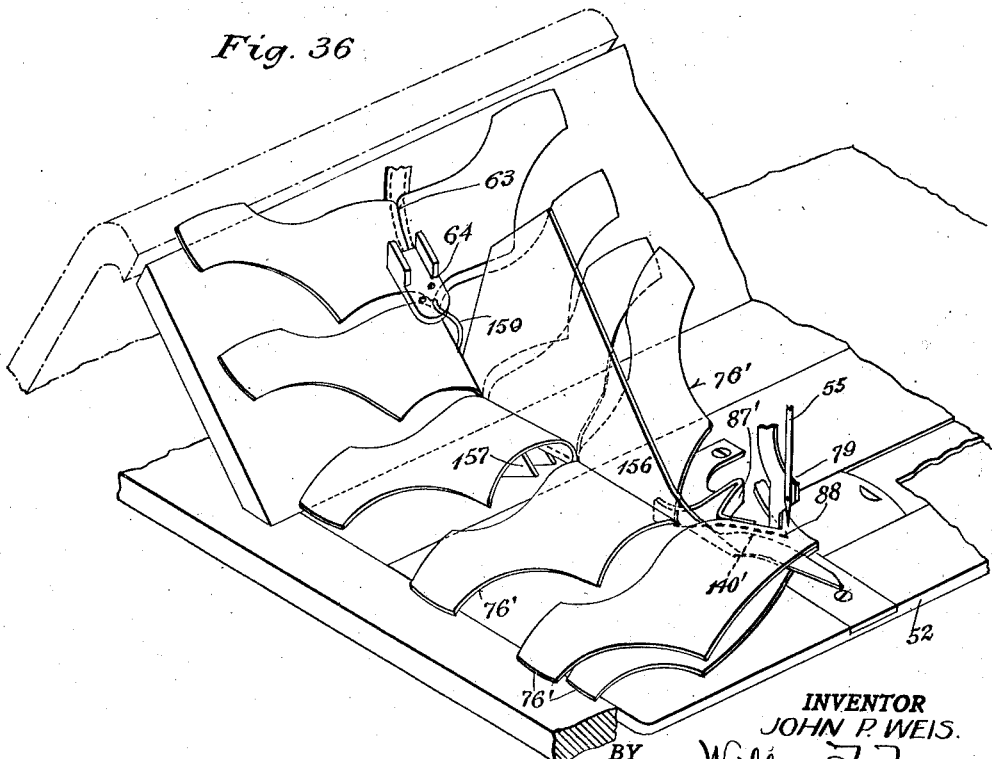

Fig. 35 is an end view of the two sewing mechanisms angularly disposed and laterally offset relative to each other. Fig. 36 is a diagrammatic plan of the work guides shown in Fig. 35. Fig. 37 is a top view of the spreader guide showing the laterally offset and curved work guide for the taping mechanism. Figs. 38 and 39 diagrammatically illustrate the automatic stop.

Before explaining the present invention in detail it should be understood that the invention is not limited to the details of construction and arrangement of parts which are illustrated in the accompanying drawings, since the principles of the invention are capable of other embodiments, and that the phraseology employed is for the purpose of description and not of limitation.

In its broader aspects the present invention comprises a frame 44 with a table 45 upon which there is suitably located and secured a first sewing mechanism 46, a second sewing mechanism 47, and an intermediate taping mechanism 48, operated coordinately by a driving mechanism 49. These sewing mechanisms and the taping mechanism may, for economy, be well known standard units, functioning through their regular operating instrumentalities, together with special instrumentalities provided by the present invention, and due to their special arrangement and driving relationship, provide a novel method and a highly efficient structure for forming various types of seams. The first sewing mechanism 46 is the well known "Metropolitan" sewing machine including a main frame 50 with a lower arm 51 supporting a usual cloth plate 52 and rotatably supporting a main drive shaft 53 capable of operating a feed dog 54 and looper 55, and through an enclosed drive operating an upper shaft 56 in an upper arm 57 to reciprocate a needle bar 58 and needle 59 in cooperation with the looper 55, while a presser foot 60 and presser bar 61 may be lowered toward the cloth plate by a hand lever 62 in order to press work toward the feed dog for effective feeding.

The second sewing mechanism 47 is a standard Metropolitan sewing machine similar to the first sewing mechanism 46 excepting that it is of a double needle 59' and double looper 55' type to form multiple lines of stitching 63; and a modified form of presser foot 64 with a channel 65 is provided (and accommodates the plurality of needles). The supports, guides, and handling instrumentalities for the looper and needle threads may be of usual construction and are therefore not illustrated. Since these sewing mechanisms 46 and 47 are standard well known units, detailed description of their operating instrumentalities and mode of operation is deemed unnecessary.

The taping mechanism 48 shown in Figs. 1–5 particularly is also a standard unit, slightly modified for use with this invention, known to the trade as the "Prime" seam pressing and taping mechanism, and except for the tape supplies and the tape and work guiding means is in the form also illustrated and described in the United States Patent No. 1,794,204 to Ridderstrom. In general it comprises a frame 66 with an overhanging arm 67 supporting a main drive shaft 68 with a novel intermittent driving pulley mechanism 69 at one end for imparting a step-by-step rotation to an upper roller 70 at the other end of the shaft, and includes a cooperating lower roller 71 mounted for free rotation on a stud 72 carried by a yoke 73. The yoke is secured to an offset shaft 74 so that it may be swung from the operative position shown by full lines in Fig. 1 to the dot-and-dash line 75 inoperative position. Normally it is urged by strong spring pressure into the operative position to press and to feed work 76 between the upper and lower rollers. Any usual pedal connection to the standard yoke control 77 (see Fig. 10) may be provided to move the yoke 73 and lower roller to the inoperative position. Similar usual pedal connections to the lever 78 and associated presser bars 61 may be provided to lift the presser feet 60 and 64 of the sewing mechanisms. The connections may be made integral so that the taping mechanism and presser feet may be moved to inoperative position coordinately.

A trimming device 79 may be provided with the first sewing mechanism 46 to trim the work 76 as it is being stitched. This trimming device may be carried by a slide 80 for reciprocation between rails 81 and 82 by a lever connection 83 to the needle bar 58 within the upper arm 57. This trimming device is completely described and claimed in the J. P. Weis application Serial No. 640,933 filed November 3, 1932, but may be of other standard and well known types for sewing machines, preferably adjustable laterally relative to the line of stitching. The trimming device may be omitted entirely when the run of work does not require trimming, or may be rendered inoperative by merely removing a screw 84 and cutter 85 when the work does not require trimming.

Work guides and controls

Novel work guiding and controlling instrumentalities provided by the present invention may best be seen in Figs. 1–5, and 12–24 of the type now preferred in making the forms of seam shown in Figs. 30A–E. To guide the work 76, for example, a pair of superposed main plies 86 between the first sewing mechanism 46 and the taping mechanism 48 and to variously condition the work 76, there is provided a usual adjustable guide 87 for locating the edges of the plies laterally relative to a needle and to a line of stitching 88, and to the trimming device 79 when the latter is used. A spreader guide 89 in the form of a horn with a yoke 90 adapted to hook and pivot on the lower roller stud 72 extends from the roller 71 of the taping mechanism 48 to a point adjacent the needle 59 where it is provided with a thin and narrow finger 92 to fit between the two main plies, but which gradually tapers, becoming larger in cross section as it approaches the roller 71. An adjustable stud 93 may be regulated to space the finger 92 from the cloth plate 52 to permit free passage of the lower ply. A spring 94 between the arm and spreader guide keeps the latter in operative position on the stud 72 and regulating screw while the yoke is in the operative position and allows the yoke to be moved to the inoperative position without damage.

An upper guide 95 is supported substantially centrally of the spreader guide by an arm 96 supported on the main drive shaft 68. This upper guide may be pressed toward the spreader guide by its own weight, by a weight 97, by springs 98, or 99 or by a rod 100 adapted to urge the arm 96 and guide 95 in a clockwise direction. The guide may be moved to an inoperative position shown by dot-and-dash lines 101 either through lifting it by hand or by any usual foot pedal connection to the rod 100. The guide is preferably made with two side walls 102 and 103 with flaring ends 104 and 105 as they approach the first sewing mechanism, adapted to move the seam 106 of sewed plies centrally relative to the work support and to the subsequent cooperating rollers 70 and 71.

A somewhat similar lower work support 107 and upper work guide 108 is provided between the taping mechanism 48 and the second sewing mechanism 47. The work support 107 is preferably in the form of a plate (see Figs. 1 and 13 particularly) having a tongue 109 securable in a regular throat plate channel 110 of the sewing machine as by screws 111 and having a wide spaced and curving table 112. The plate is adapted to spread and support the main plies 86 in a horizontal plane at the taping mechanism and in their travel to the second sewing mechanism 47 with a U-shaped cut out 113 adapted to clear and project in front of the lower roller 71 adjacent the spreader guide 89. It may be provided with a shallow channel 114 to form a guide for a tape if a tape is applied to the under side of the work at the taping mechanism. The upper guide 108 includes a pair of side plates 115 and 116 held in spaced relation by a cross strap 117 and has a pair of apertures 118 adapted to hook over the shaft 68 or to hook over a hub 119 of the upper roller 70 and is urged toward the work supporting plate 107 by its own weight or by the addition of an auxiliary weight 120.

Tape supplies

Novel tape supplies 121 with spools 122 of tape 123 are provided by the present invention which may be used equally well to direct an upper tape 123a and to apply a lower tape 123b and to furnish the tape to either the taping mechanism 48 or to the second sewing mechanism 47 without changing the location of the tape supply spools 122. To assist in directing the tape to either of these stations, the present invention provides a tape guide 124 in the form of a U-shaped channel 125 having a pivotal connection 126 with studs 127 and 128 supporting the tape spools so that it may be located and held in the solid line positions shown in Fig. 1 by plungers 129 entering suitable holes in an arm 130 and in the yoke 73 to direct the tapes to the rollers of the taping mechanism.

The same channel 125 may be rotated to and held in the dot-and-dash line positions 131 and 132 by passing the same plunger into holes 133 and 134 of a lug 135 and the yoke so that tape 123a may advantageously be directed from the upper tape supply to the channel 65 in the presser foot 64 or from the lower tape supply to a slot 117' and channel 114 in the work supporting plate 107.

Any suitable means, such as locking collars 136 may be provided to hold the tape supplies on the main studs 127 and 128 so that exhausted tape spools may be replaced. Although the tape supply need not include the tape guides 124, as illustrated diagrammatically in Figs. 3 and 4 particularly, a more uniform product results through their use.

Operation

Operation of the instrumentalities just described, for the production of a product similar to that shown in Fig. 30A is accomplished by passing the two superposed plies 86 over the cloth plate 52 of the first sewing mechanism 46 where the finger 92 of the spreader guide 89 fits between the two plies adjacent the needle 59 and where the guide 87 aligns the edges thereof relative to the needle and to the trimming device 79 when the latter is used. Then, as the machine of the present invention, including the first and second sewing mechanisms 46 and 47 and the taping mechanism 48 are operated in unison by the driving mechanism 49, hereinafter described in detail, the feed dog 54 and presser foot 60 moves the superposed plies relative to the needle to form the line of stitching 88 joining the two plies and forming a main seam 106 with wide seam margins 137 (while the trimming device, if used, straightens out the rough edges 138) all as shown in Figs.

12–16. Subsequently, a plow 139 initially spreads the seam margins as shown in Figs. 17 and 18.

Thence, as the work is fed to the rear of the first sewing mechanism 46 into the free space (of any desired extent) between the cloth plate 52 and the taping mechanism 48, the lower ply 86 is underturned by a taper 140 and partly by its own weight, so that a rather full separation of the two main plies occurs and at the same time the upper ply tends to drop around the spreader guide 89 so that the seam 106 is moved through a right angle and so that the seam margins 137 are moved from a hidden side position to a fully exposed top position above the spreader guide enabling the operator to thoroughly check the condition thereof. This is a very important advantage.

In this turning, the end wall 104 of the upper guide engages with the seam margins and gradually directs them into a main channel 141 viz., from the position shown in Fig. 19 to the position shown in Fig. 20. In the further feeding of the stitched plies through the upper guide 95 a plow 142 similar to the plow 139 spreads the seam margins from the right angle position relative to the main plies shown in Fig. 20 down in the direction of the arrows C of Fig. 20 onto the adjacent main plies as shown in Fig. 21. Next, the stitched plies pass between the upper and lower rollers 70 and 71 where an upper tape 123a is directed to the seam margins by the tape guide 124 and a lower tape 123b applied on the opposite side of the seam by the lower tape guide. The upper roller 70 is provided with rubber flanges 144 adapted to press the tape down over the seam margins onto the adjacent main plies as may best be seen in Fig. 23 while the lower roller is preferably provided with a shallow groove 146 adapted to locate and press the bottom tape against the other side of the seam. After the rollers engage the work, in addition to pressing the tapes thereon they serve to pull the work through the guides 89 and 95 and from the first sewing mechanism.

Although the upper adhesive tape 123a alone, through its connection with the main plies 86, is sufficient to hold the seam margins 137 down onto the main plies, in some forms of work it is preferable to stitch these together and this is accomplished by passing the work rearwardly of the taping mechanism 48 over the work support 107 where the channel 114 may align with the bottom tape and where the side walls of the upper guide 108 direct the work by fitting over the seam margins similarly to the rubber flanges of the upper roller as in Fig. 23 to the correct position relative to the needles 59' of the second sewing mechanism 47. The channel 65 of the presser foot 64 also cooperates in a similar manner to insure proper alignment. As the work is fed through the second sewing machine the needles 59' may form the multiple lines of stitching 63 passing through the upper tape, seam margins, main plies, and lower tape as shown by solid line needles in Figs. 24 and 30A, or may be passed through these parts less the seam margins as shown by dot-and-dash line needles in the same figures. Thereafter the work is fed rearwardly of the second sewing mechanism onto the floor or into a suitable container.

The seam illustrated in Fig. 30B is similarly formed merely by omitting the lower tape 123b and preferably having the lower roller 71 plain faced. Again the secondary stitching 146 is not required because the tape is pressed over the folded margins down onto main plies 86, but may, if preferred, be provided through the tape, seam margins, and main plies or into the tape and main plies alone. The seam of Fig. 30C is formed in like manner by merely providing a plain faced lower roll, a spool 122 of narrower tape 123 and a proportionately narrower tape guide 124 properly located on the stud 127. The seam of Fig. 30D may be formed by moving the spool of narrower tape and the narrower tape guide onto the lower stud 128, and omitting the upper tape 123a in which event the lower roll with a groove may be again provided. Also, the seam of Fig. 30E is formed by merely combining the arrangements for seams in Figs. 30C and 30D just described in detail.

All of the seams in Figs. 30A through E may be formed with adhesive tape or tapes alone (less stitching) if preferred, by eliminating the second stitching mechanism 47 and allowing the work to feed off the lower roll 71, with a drive belt 147 as shown in Fig. 4, or by removing the needles 59' of the second sewing mechanism. In some work it is preferable to have both tapes plain and stitched or one plain and stitched and one adhesive tape. The taped seam, less the stitching, is sometimes preferable, as for ladies shoes and in waterproof articles. The tape 123 may be provided with an adhesive coating of any type and may even have a soft rubber facing which will heat or flow sufficiently under pressure of the rollers 70 and 71 to adhere to mating parts of the work. In the formation of all the seams illustrated both with and without stitching in Figs. 30A–E, no changes need be made in the upper roll 70, upper guides 95 and 108, lower spreader guide 89 or to the support plate 107, nor need the lower roller 71 be changed if a plain faced roller is used throughout.

It should also be noted that the apparatus so far described can, by merely omitting the tapes 123, be used without change to turn the work relative to the first sewing mechanism 46 with the seam margins 137 advantageously moved upwardly and exposed to sight, to fold and press the seam margins onto the main plies 86 and to sew the margins onto the main plies. (Like Fig. 30C, less the tape.) If a nonadhesive tape is secured to the work by stitching 146, as illustrated in Figs. 30A through E, it may be supported in the tape supplies 121 and passed to the rollers 70 and 71 as already described, or may be located in the dot-and-dash line positions 131 and 132 to pass tape downwardly to the channel 65 in the presser foot 64 and upwardly through the aperture 117' to the channel 114, either or both tapes as used being drawn from the supplies by the regular feeding action of the feed dog 54, and presser foot; these instrumentalities, however, not being powerful enough or satisfactory to press an adhesive tape securely in place.

Those forms of seam shown in Figs. 31H, I, and J are somewhat similar to the seams already described, but have narrower seam margins 148 as shown in Fig. 31F, which are not folded back onto the main plies 86 as shown in Fig. 31G, formed by suitable adjustment of the gauge 87 (and of the trimming device 79, if used). The work supports, guides, and rollers are the same in principle as those described for seams in Figs. 30A through E, differing mainly in size only, viz., the first spreader 139 is eliminated, the spreader guide 89 is the same, the upper guide 95 remains the narrow width of Fig. 20 through its length (rather than broadening to accommodate folded down seam margins as shown in Fig. 21) and the plow 142 serves only to press down the edges 149 of the margins rather than to overturn them (the latter being pressed nearly flat, but which are left high herein to facilitate illustration). Similarly the flat center section 150 of the upper roller 70 is made narrower and the rubber flanges 144 made wider to conform with the contours of the seam 31H, I, and J. The upper guide 95 is likewise made narrower. All of these are slight changes in proportions and detailed illustrations, and descriptions seem unnecessary.

In forming the seams of Figs. 31H, I, and J the tape 123 (which may be plain or adhesive) may be applied to one or both sides of the work before or after the taping mechanism 48, either adhesively or by stitching alone, or by both, all substantially as hereinbefore described for the seams shown in Figs. 30A–E.

The seams shown in Figs. 32M–O, with non-adhesive tapes 123 stitched and with adhesive tapes 123 stitched and not stitched, are similarly produced by using a standard sewing machine of the overedge stitching type to form the line of stitching 151 shown in Fig. 32K, in the well known manner, and subsequently using substantially all the mechanism and apparatus used in forming the seams shown in Figs. 31H, I, and J and just described in detail, differing only in the provision of plain faced rollers, or use of shallow groove rollers 71 on the sides where tape 123 is applied.

Also, the plow 142 is set lower in the upper guide 95 to flatten out the seam as shown in Fig. 32L just prior to its entering the rollers 70 and 71. The stitching initially holds the edges of the plies together to centralize the seam in upper guide 95. The angle 140 on the spreader guide 89 and the lateral location and lengthwise spacing of the taping mechanism 48 relative to the first sewing mechanism 46 is such that an ideal underturning of the lower ply and arcuate movement of the seams shown in Figs. 30, 31, and 32 upwardly to fully exposed view is uniformly and effectively accomplished.

If preferred the intermediate taping mechanism 48 may, to save the cost of this complete machine, be eliminated by providing a simple block in place of the frame 66 with studs 68 and 72 and 73 to support the guides 89, 95, and 108, and studs 127 and 128 to support the tape supplies 124 similarly to the showing of Fig. 1—for example, when it is desired to sew plain tapes to two sides of the seam.

Also, if preferred, a stamper type seam pressing and tape applying machine of the well known "Boston" type disclosed in the United States Patent No. 1,691,493 to Osgood may be used in place of the "Prime" double roller machine already described. Such an arrangement is shown in Fig. 8, in which the usual main stamper and feeder element 152 is driven in proper ratio with the feed of the first and second sewing mechanism. The spreader guide 89 is merely proportioned to hook upon the shaft of roller 71', the work supporting plate 107 may be the same, and the upper guides 95 and 108. An upper tape 123A may be directed to the stamper with the regular guides of this "Boston" machine. An extra tape 123B may be directed up to the underside of the work by being passed upwardly from any suitable supply to roller 154 in the spreader guide 89. The stamper may, through wires 155, be heated in the usual manner to heat the seam 106 or the adhesive of the tapes.

For long straight run seams as illustrated in Fig. 12 the sewing mechanisms 46 and 47 and the taping mechanism 48 are preferably horizontally and laterally in line as shown in Figs. 1, 3, 4, 5, and 13, but for curved seams as illustrated in Figs. 36 and 37 the sewing mechanisms 46 and 47 are preferably on planes at an angle to one another and out of line laterally as shown in Figs. 7, 35, 36, and 37. To most clearly show this feature and to illustrate the adhesive tape applying feature in unitary practical combination with a seam sewing machine wherein the seam margins are on the underside, the apparatus, as shown in Fig. 7, is provided with an upper spreader guide 156 adapted to overturn the upper ply while first the lower and then both plies rest upon the plate guide 107 which in this form is long and flat enough to be adjacent the cloth plate 52 of the first sewing mechanism.

Fig. 37 shows the laterally offset relation of the taping mechanism 48 relative to the needle 59 when the lower ply is to be underturned, the guide 92 insuring travel of the seam relative to the predetermined curve 140' and special guide 87' on a modified spreader guide 89. Figs. 35 and 36 disclose the curving offset and angular relationship of the first and second sewing mechanisms clearly with an upper overturning guide 156 and a lower work support 157 with a channel 158 to receive the seam margins and a fin 159 on the presser foot to centralize the seam relative to the needles 59'. Also, Fig. 35 shows an automatic control 160 adapted to stop operation of the electric motor and thereby the main driving means upon exhaust of the tape supply 121, which in Figs. 38 and 39 is shown with the tape guides 124 of the main form of the invention.

*Drive and control*

Driving and controlling of the various mechanisms is accomplished in a novel manner. The main drive is best seen in Figs. 3–6, 9–11, 25–29 and comprises the motor 161, energized through main wiring 162 and switch 163 to rotate a flywheel 164 with a motor shaft. A bracket 165 encloses the flywheel, and on a stud 166 fixedly supports a secondary bracket 167 and a spring pressed collar 168 which supports and normally urges a driver plate 169 into braking engagement with the secondary bracket. By stepping on a treadle 170, a connection 171 causes a lever 172 to move the collar 168 and driver plate 169 into frictional engagement with the flywheel to rotate interconnected pulleys 173 and 174 by a spline connection of the driver plate and screw connection of the pulley 173 to a shaft 175. Slower than motor speed for the pulleys can be had by slipping the driver plate on the flywheel. The pulley 173 through belt 176 and driver pulley 177 operates the first sewing mechanism, and coordinately the pulley 174 through belt 178 and combined handwheel and pulley 179 and pulley 180 operates the taping mechanism 48 and second sewing mechanism 49. Chains and sprockets may be used in place of belts and pulleys.

Interruption of drive between the sewing mechanisms 46 and 47 and the taping mechanism 48 is desirable at times in order to compensate for slippage, slight irregularities in the feed, and stretching of the work, for example to have the taping mechanism and sewing mechanism 47 continue operating while the first sewing mechanism temporarily stops. Two mechanisms 181 and 182 are provided by the present invention for this purpose. The first 181 is for foot operation, including a friction clutch 183 between the pulleys 173 and 174 controlled by a pedal 184 and chain 185 moving a bell crank 186 which, through a connection 187, breaks the clutch 183 and moves the pulley 174 free of the driver pulley 173. A spring 186 moves the free pulley and clutch into driving engagement again upon release of the pedal. Slippage rather than complete disconnection is possible.

The secondary or hand interrupter 182 is provided in the clutch pulley 177 on the first sewing mechanism as shown in detail in Figs. 28 and 29. It comprises a collar 188 secured to the main drive shaft 53 with a screw 189 to support the pulley 177 for free rotation. A handwheel 190 with a friction plate 191 is, through an attached stud 192, threaded into the collar 188. By giving the handwheel a slight clockwise turn the free pulley is locked between the friction plate and a flange 193 on the collar so that the belt 176 operates the first sewing mechanism. When the handwheel is grasped during rotation thereof the screw moves the friction plate from the pulley to interrupt the driving action. A key 194 on the friction plate riding in a notch 195 of the collar limits releasing travel of the handwheel. Screws 196 therein break this latter connection for initial assembly and for later repairs. Thus, the operator can interrupt the drive between the various main mechanisms very simply and efficiently either by foot or by hand operation. This is an advantage when the work is shoe uppers 76', the individual sets of which are joined by a line of stitching 88, which is the type of work to which the various forms of the present invention are used.

A novel drive 197 is also provided for the taping mechanism 48 as shown in detail in Fig. 25. Normally, standard taping machines have a direct plain pulley drive which would be quite impractical in a combination machine of the present type, especially since it is desirable to change the feed on stitches per inch according to the articles being produced. To adjust the feed of the taping mechanism without changing the pulley and to impart a positive step-by-step movement to the roller 70 coordinately with the sewing feed, the present invention provides a combined pulley and handwheel 198 with a collar 199 and eccentric 200 secured thereto for rotation on a stud 201 in the frame 66.

The eccentric 200 reciprocates a line 202 connected to an arm portion 203 of a cup 204 of a one way clutch 205 including a hub member 206 carrying spring pressed rollers 207 and having an attached or integral gear 208 all supported for rotation on a stud 209. A similar clutch 210 having a stationary hub member 211 with rollers 212 associated with a cup 213 and gear 214 secured to the main drive shaft 68 of the upper roller 70. Thus, when the link 202 moves to the right as viewed in Fig. 26 the clutch 205 rotates the gears 208 and 214 and the roll 70 in the direction of the arrows D and E and impart a small step-by-step rotary movement to the shaft 72 and roller 70. As the link moves in the other direction, the clutch 210 prevents return movement of gear 214 and the rollers 207 of clutch 205 are ineffective. Adjustment is easily accomplished to vary the extent of step-by-step movement by passing a screw driver through a hole 215 in the pulley 198 to loosen, slide, and lock a connection 216 at any desired point in a slot 217 of the arm.

The machine of the present invention is also arranged to stop automatically upon exhaust of the tape supply, through the provision of a switch 160 (see Figs. 35, 38, and 39) with two members 219 and 220 between which the tape passes. While tape is there the switch is closed through contacts 221 and 222, but if the tape breaks or the spool exhausts, a member 223 drops to open the circuit 162 as shown in Fig. 39 whereupon the motor automatically ceases to operate until the tape is replenished. Figs. 38 and 39 show this principle applied to the set-up of Fig. 3. It may be variously used, and has the advantage of preventing loss of work which would otherwise occur since it is not practical to run partially finished work back through the machine.

Steps in the method of the present invention for the formation of seams shown in Figs. 30A through E consists of stitching superposed plies to form a seam with seam margins (trimming the margins, if preferred), spreading the main plies, folding the seam margins, pressing an adhesive tape on one or both sides of the seam, all in a single handling of the work. The same seams may also be formed by the same series of steps but in addition in a succeeding step the tape or tapes, with or without the seam margins, stitched to the main plies, all in the single handling of the work. Heretofore separate detached machines and operations were required for anything approaching this and a less uniform and much more costly product resulted.

Steps in the method of forming the seams shown in Figs. 31H, I, and J consist of stitching superposed plies with a narrow seam margin, spreading the main plies and applying an adhesive tape on one or both sides of the seam, (and optionally the step of stitching the tapes to the plies) all in a single handling.

Steps in the formation of the seams illustrated in Figs. 30A through E with a stitched not adhesive tape consists of stitching superposed plies to form a seam with seam margins, (the step of trimming if desired), of underturning one of the main plies and fully exposing and pressing out the seam margins, of applying a tape to one or both sides of the seam, and of securing the tape with or without the seam margins to the main plies.

Similar steps are taken in the method of forming the seams in Figs. 32M through O as in forming seams in Figs. 31H through J as just described. Steps in the formation of the seam shown in Fig. 33 consists of stitching superposed plies to form a seam with wide seam margins, overturning one main ply, spreading the seam margins, and applying an adhesive tape on one or both sides of the seam (with or without the additional step of stitching the tape or tapes to the main plies with or without also stitching the seam margins to the main plies) all in a single handling. The seam of Fig. 34 is produced with the same method just described for the seam of Fig. 33 except that the step of folding seam margins is omitted.

The terms and illustrations used herein are intended to assist in an understanding of the invention and not to limit it, for variations and modifications may be made within the scope of the invention and portions may be used without others.

Having thus described the present invention, what is claimed as new and for which it is desired to obtain Letters Patent, is:

1. In one machine for sewing and taping a seam in a single handling the combination of a first sewing mechanism for stitching two superposed plies to form a first seam with seam margins; means for spreading and turning the lower ply to substantially the plane of the upper ply, and for moving said seam margins above the main plies; means for guiding a pair of tapes to the top and bottom of the first seam; a second sewing mechanism for sewing the pair of tapes to the plies; channel means for accurately guiding the stitched plies from the first to the second sewing mechanism; and driving mechanism for operating said first and second mechanisms in timed relation.

2. In one machine for sewing and taping a seam in a single handling the combination of a first sewing mechanism for stitching two superposed main plies to form a seam with seam margins; means for spreading and turning the lower ply to substantially the plane of the upper ply and for moving the seam margins above the main plies; means for spreading the seam margins; a taping mechanism adapted to apply a tape down onto said spread seam margins; sewing mechanism adapted to stitch the tape to the spread seam margins and to the main plies; and driving mechanism for operating said first and second sewing mechanisms in timed relation.

3. In one machine for sewing and taping a seam in a single handling the combination of a first sewing mechanism for stitching superposed main plies to form a seam with seam margins; means for spreading and turning the lower ply to substantially the plane of the upper ply, and for moving the seam margins above the main plies; a taping mechanism adapted to press tapes over said previously sewed seam at opposite sides of the opened plies; a second sewing mechanism adapted to stitch at least one of said tapes to said main plies; means including members above the main plies engaging the seam margins for guiding the stitched and taped plies from the taping mechanism to the second sewing mechanism; and driving mechanism for operating said first and second sewing mechanisms and the taping mechanism in timed relation.

4. In one machine for sewing and taping a seam in a single handling the combination of a first sewing mechanism for stitching superposed main plies of material to form a seam with seam margins; means for spreading and turning the lower ply to substantially the plane of the upper ply, and for moving the seam margins above the main plies; means adapted to apply a tape over said seam margins and to stitch said tape to the main plies; and driving mechanism for operating said first sewing mechanism and said last named means in timed relation.

5. In one machine for sewing and taping a seam the combination of a first sewing mechanism for stitching superposed main plies of material to form a seam with seam margins; means including a large generally semicircular member fitting between the main plies and a channel member above the semicircular member engaging the seam margins, for spreading and turning the lower ply to substantially the plane of upper ply and for moving the seam margins above the main plies; taping means adapted to apply tapes over said previously sewed seam and the seam margins, at opposite sides of the spread main plies; a second sewing mechanism for stitching said tapes to the main plies; and driving mechanism for operating said first and second sewing mechanisms and the taping mechanism in timed relation.

6. In one machine for sewing and taping a seam in a single handling the combination of a first sewing mechanism for stitching superposed plies to form a seam with seam margins; means including a large generally semicircular member fitting between the main plies and a channel member above the semicircular member engaging the seam margins for spreading and turning the lower ply to substantially the plane of the upper ply and for moving the seam margins above the main plies; means adapted to apply a tape over the seam margins and to stitch said tape to the main plies; and driving mechanism for operating said first sewing mechanism and said last named means in timed relation.

JOHN P. WEIS.